United States Patent
Xu

(10) Patent No.: US 10,869,301 B2
(45) Date of Patent: Dec. 15, 2020

(54) INFORMATION TRANSMISSION METHOD AND APPARATUS AND STORAGE MEDIUM

(71) Applicant: GUANGDONG OPPO MOBILE TELECOMMUNICATIONS CORP., LTD., Guangdong (CN)

(72) Inventor: Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/530,763

(22) Filed: Aug. 2, 2019

(65) Prior Publication Data

US 2019/0357206 A1   Nov. 21, 2019

Related U.S. Application Data

(63) Continuation of application No. PCT/CN2018/072583, filed on Jan. 15, 2018.

(60) Provisional application No. 62/454,216, filed on Feb. 3, 2017.

(51) Int. Cl.
*H04W 72/04* (2009.01)
*H04L 5/00* (2006.01)

(52) U.S. Cl.
CPC ....... *H04W 72/0413* (2013.01); *H04L 5/0012* (2013.01); *H04L 5/0048* (2013.01)

(58) Field of Classification Search
CPC ......... H04L 1/0079; H04L 5/00; H04L 5/001; H04L 5/0012; H04L 5/0048; H04L 5/0053; H04L 27/00; H04L 27/261; H04L 27/2613; H04L 29/02; H04L 2025/03796; H04W 72/04; H04W 72/0406; H04W 72/0413; H04W 72/1242; H04W 72/1278; H04W 72/1284; H04W 74/002; H04W 74/004; H04W 76/27
See application file for complete search history.

(56) References Cited

U.S. PATENT DOCUMENTS

| | | | | |
|---|---|---|---|---|
| 8,885,591 | B2 * | 11/2014 | Han | H04L 5/0048 |
| | | | | 370/329 |
| 9,210,698 | B2 * | 12/2015 | Yang | H04L 1/0057 |
| 9,282,550 | B2 * | 3/2016 | Han | H04B 1/7103 |
| 9,451,599 | B2 * | 9/2016 | Cheng | H04L 1/0073 |

(Continued)

FOREIGN PATENT DOCUMENTS

| | | |
|---|---|---|
| CN | 102143586 | 8/2011 |
| CN | 103026650 | 4/2013 |
| CN | 105490781 | 4/2016 |

OTHER PUBLICATIONS

"Intel Corporation, UL control channel design with long duration, Spokane, USA, Jan. 16-20, 2017, 3GPP TSG RAN WG1 NR Ad-Hoc Meeting: Discussion and Decision, R1-1700368, pp. 1-5." (Year: 2017).*

(Continued)

*Primary Examiner* — Tri H Phan
(74) *Attorney, Agent, or Firm* — Hodgson Russ LLP

(57) ABSTRACT

Disclosed is an information transmission method. In the method, an RS symbol is placed at beginning of a PUCCH, UCI symbols are placed after the RS symbol in the PUCCH, and the PUCCH is transmitted. Also disclosed is an information transmission apparatus and computer readable storage medium.

14 Claims, 6 Drawing Sheets

(56) References Cited

U.S. PATENT DOCUMENTS

| | | | | |
|---|---|---|---|---|
| 9,888,462 | B2* | 2/2018 | Xia | H04L 5/0053 |
| 10,237,105 | B2* | 3/2019 | Huang | H04L 1/0625 |
| 10,256,964 | B2* | 4/2019 | Wang | H04L 5/0048 |
| 10,491,441 | B2* | 11/2019 | Hwang | H04L 5/0051 |
| 10,523,395 | B2* | 12/2019 | Kim | H04W 72/04 |
| 10,660,076 | B2* | 5/2020 | Kim | H04L 1/1819 |
| 2012/0113831 | A1 | 5/2012 | Pelletier et al. | |
| 2013/0022019 | A1 | 1/2013 | Han et al. | |
| 2015/0071195 | A1 | 3/2015 | Park et al. | |
| 2016/0014770 | A1 | 1/2016 | Papasakellariou et al. | |
| 2016/0192385 | A1 | 6/2016 | Tooher et al. | |
| 2016/0360518 | A1* | 12/2016 | Noh | H04L 27/2607 |
| 2017/0111894 | A1 | 4/2017 | Chen et al. | |
| 2019/0223201 | A1* | 7/2019 | Lee | H04L 5/0048 |
| 2020/0106546 | A1* | 4/2020 | Takeda | H04W 72/0413 |

OTHER PUBLICATIONS

"NTT DOCOMO, Inc., UL control channel structure with long duration, Spokane, USA, Jan. 16-20, 2017, 3GPP TSG RAN WG1 NR AH-NR Meeting: Discussion and Decision, R1-1700623, pp. 1-6." (Year: 2017).*

Guangdong OPPO Mobile Telecom, "Design of NR PUCCH with long duration," 3GPP TSG RAN WG1 meeting #88, R1-1701957, Feb. 2017, 5 pages.

WIPO, ISR for PCT/CN2018/072583, dated Mar. 27, 2018.

Catt, "Long PUCCH structure," 3GPP TSG RAN WG1 NR Ad-Hoc Meeting, R1-1700198, Jan. 2017, 4 pages.

Ericsson, "On DM-RS and short UCI," TSG-RAN WG1 #87, R1-1612917, Nov. 2016, 2 pages.

Intel Corporation, "Aspects of reference signal design for URLLC services," 3GPP TSG RAN WG1 Meeting #87, R1-1612581, Nov. 2016, 7 pages.

LG Electronics, "Design of short duration NR-PUCCH format," 3GPP TSG RAN WG1 NR Ad-Hoc Meeting, R1-1700504, Jan. 2017, 6 pages.

LG Electronics, "Design of long duration NR-PUCCH format," 3GPP TSG RAN WG1 NR Ad-Hoc Meeting, R1-1700505, Jan. 2017, 6 pages.

Motorola Mobility, "Discussion on UCI transmission in NR," 3GPP TSG RAN WG1 Meeting #87, R1-1612747, Nov. 2016, 4 pages.

Nokia et al., "On the design of long PUCCH for NR," 3GPP TSG RAN WG1#NR, R1-1701014, Jan. 2017, 3 pages.

NTT DOCOMO, Inc., "Summary of [87-36]: Mini-slot designs for NR," 3GPP TSG RAN WG1 AH_NR Meeting, R1-1700617, Jan. 2017, 23 pages.

Sharp, "5G NR long PUCCH considerations," 3GPP TSG RAN WG1 NR Ad Hoc Meeting, R1-1700731, Jan. 2017, 3 pages.

EPO, Office Action for EP Application No. 18747386.3, dated Nov. 27, 2019.

TIPO, Office Action for TW Application No. 107103731, Nov. 29, 2019.

LG Electronics et al., "WF on Long Duration PUCCH," 3GPP TSG RAN WG1 #87, R1-1613411, Nov. 2016, 4 pages.

Huawei et al., "WF on PUCCH channelization," 3GPP TSG RAN WG1 Meeting #87, R1-1613636, Nov. 2016, 4 pages.

EPO, Office Action for EP Application No. 18747386.3, dated Aug. 13, 2020.

ISDEC, Office Action for CA Application No. 3052509, dated Sep. 17, 2020.

INAPI, Office Action for CL Application No. 201902175, dated Oct. 27, 2020.

CNIPA, First Office Action for CN Application No. 201911295937.5, dated Nov. 3, 2020.

* cited by examiner

INFORMATION TRANSMISSION METHOD AND APPARATUS AND STORAGE MEDIUM

CROSS-REFERENCE TO RELATED APPLICATIONS

The present application is a continuation of International Application No. PCT/CN2018/072583, filed Jan. 15, 2018, which claims priority to U.S. Provisional Application No. 62/454,216, filed Feb. 3, 2017. The entire disclosures of the aforementioned applications are hereby incorporated by reference.

TECHNICAL FIELD

The present disclosure relates to the technical field of communications, and particularly an information transmission method and apparatus and storage medium.

BACKGROUND ART

In a Fourth-Generation (4G) Long Term Evolution (LTE) communication system, as shown in FIG. 1, Physical Uplink Control Channel (PUCCH) is transmitted in a full uplink subframe with fixed number of symbols (e.g., 14 symbols) at the edges of system bandwidth, and is used to carry uplink control information (UCI) such as Ack/NACK for downlink Physical Downlink Shared Channel (PDSCH) transmission and channel state information (CSI) feedback from the User Equipment (UE).

When it comes to a Fifth-Generation (5G) New Radio (NR) communication system, due to the introduction of higher frequency, the larger path loss could deteriorate the cell coverage. In order to transmit uplink control information (UCI) for the cell edge UE or wherever UE has a coverage issue, a concept of PUCCH with long duration (also referred to as PUCCH with long format) is proposed. Here, the term "long duration" generally means that at least 4 symbols can be transmitted in the PUCCH. Accordingly, design of the PUCCH with long duration to achieve desired performances becomes an issue to be solved.

DISCLOSURE OF THE INVENTION

An objective of this disclosure is to provide an information transmission method. The method includes that an RS symbol is placed at beginning of a PUCCH, UCI symbols are placed after the RS symbol in the PUCCH, and the PUCCH is transmitted.

In some embodiments, the PUCCH may be transmitted in one or more slots of a first type, wherein all symbols in each of the slots of the first type are uplink, which are dedicated for transmitting the PUCCH; or the PUCCH may be transmitted in one or more slots of a second type, wherein more than one half of symbols in each of the slots of the second type are uplink, which are dedicated for transmitting the PUCCH; or the PUCCH may be transmitted in multiple slots comprising one or more slots of the first type and one or more slots of the second type. The first RS symbol may be transmitted at the beginning of the PUCCH, in each of the slots of the first or second type.

In some embodiments, a second RS symbol may further be placed at end of the PUCCH, in each of the slots of the first or second type; and/or one or more third RS symbols are placed evenly in between the UCI symbols, in the PUCCH in each of the slots of the first or second type.

In some embodiments, one or two RS symbols may be placed immediately after every n contiguous UCI symbols, in each of the slots of the first or second type, until a last symbol in the slot is filled by an RS or UCI symbol, where n is an integer greater than or equal to 1.

In some embodiments, before transmitting the PUCCH, Space-Time Block Coding (STBC) may be performed on at least a portion of the UCI symbols in the PUCCH to build STBC codes.

In some embodiments, an orthogonal sequence may be generated for each of modulated symbols carrying UCI in the PUCCH, wherein the UCI symbols comprise m UCI symbols in time, where m is an integer, and greater than or equal to 2; the performing STBC on at least a portion of UCI symbols may include: for $(2k-1)^{th}$ and $(2k)^{th}$ UCI symbols in time, the elements of the orthogonal sequences corresponding to the $(2k-1)^{th}$ and $(2k)^{th}$ UCI symbols are directly used to build a first set of pairs of STBC codes, and conjugation transformation on the elements of the generated orthogonal sequences corresponding to the $(2k-1)^{th}$ and $(2k)^{th}$ UCI symbols is performed to build a second set of pairs of STBC codes; the PUCCH with the first set of pairs of STBC codes may be transmitted via a first antenna, and the PUCCH with the second set of pairs of STBC codes may be transmitted via a second antenna, where k is a positive integer and smaller than or equal to m/2.

In some embodiments, when m is an odd number, before transmitting the PUCCH, Cyclic Delay Diversity (CDD) or Space Orthogonal-Resource Transmit Diversity (SORTD) may be performed on a last DCI symbol in time among the m DCI symbols to build CDD or SORTD codes for the last DCI symbol.

In some embodiments, before the transmitting the PUCCH, the PUCCH transmitted in a single one of the first or second slots may be divided into a first portion and a second portion; the first portion of the PUCCH may be transmitted in a first frequency band; and the second portion of the PUCCH may be transmitted in a second frequency band.

In some embodiments, the PUCCH may be divided such that the second portion of the PUCCH begins with an RS symbol.

Another objective of this disclosure is to provide an information transmission apparatus. The apparatus includes a processor; and one or more modules stored on a memory and executable by the processor, the one or more modules include: a placement module, configured to place a first RS symbol at beginning of a Physical Uplink Control Channel (PUCCH), and place UCI symbols after the first RS symbol in the PUCCH; and a transmitter, configured to transmit the PUCCH.

In some embodiments, the transmitter may be configured to perform one of the following: transmit the PUCCH in one or more slots of a first type, wherein all symbols in each of the slots of the first type are uplink, which are dedicated for transmitting the PUCCH; transmit the PUCCH in one or more slots of a second type, wherein more than one half of symbols in each of the slots of the second type are uplink, which are dedicated for transmitting the PUCCH; and transmit the PUCCH in multiple slots comprising one or more slots of the first type and one or more slots of the second type; and the RS placement module may be configured to place the first RS symbol at the beginning of the PUCCH, in each of the slots of the first or second type.

In some embodiments, the placement module may further be configured to perform at least one of the following: place a second RS symbol at end of the PUCCH, in each of the slots of the first or second type; and place one or more third RS symbols evenly in between the UCI symbols, in the PUCCH in each of the slots of the first or second type.

In some embodiments, the placement module may further be configured to place one or two RS symbols immediately after every n contiguous UCI symbols, in each of the slots of the first or second type, until a last symbol in the slot is filled by an RS or UCI symbol, where n is an integer greater than or equal to 1.

In some embodiments, the one or more modules may further include a transmit diversity module, configured to perform Space-Time Block Coding (STBC) on at least a portion of the UCI symbols in the PUCCH to build STBC codes.

In some embodiments, the one or more modules may further include a sequence generation module configured to generate an orthogonal sequence for each of modulated symbols carrying UCI in the PUCCH, where the UCI symbols comprise m UCI symbols in time, where m is an integer, and greater than or equal to 2; the transmit diversity module may be configured to: for $(2k-1)^{th}$ and $(2k)^{th}$ UCI symbols in time, directly use elements of the orthogonal sequences corresponding to the $(2k-1)^{th}$ and $(2k)^{th}$ UCI symbols to build a first set of pairs of STBC codes, and perform conjugation transformation on the elements of the generated orthogonal sequences corresponding to the $(2k-1)^{th}$ and $(2k)^{th}$ UCI symbols to build a second set of pairs of STBC codes; the transmitter may be configured to: transmit the PUCCH with the first set of pairs of STBC codes via a first antenna; and transmit the PUCCH with the second set of pairs of STBC codes via a second antenna, where k is a positive integer and smaller than or equal to m/2.

In some embodiments, when m is an odd number, before the PUCCH is transmitted, the transmit diversity module may further be configured to perform Cyclic Delay Diversity (CDD) or Space Orthogonal-Resource Transmit Diversity (SORTD) on a last DCI symbol in time among the m DCI symbols to build CDD or SORTD codes for the last DCI symbol.

In some embodiments, the transmitter may further be configured to: divide the PUCCH transmitted in a single one of the first or second slots into a first portion and a second portion; transmit the first portion of the PUCCH in a first frequency band; and transmit the second portion of the PUCCH in a second frequency band.

In some embodiments, the PUCCH may be divided such that the second portion of the PUCCH begins with an RS symbol.

The disclosure also provides a non-transitory computer readable storage radium, having instructions stored therein, which when executed by a processor, causes the processor to execute the method as described above.

DETAILED DESCRIPTION OF THE INVENTION

Various aspects are now described with reference to the drawings. In the following description, for purposes of explanation, numerous specific details are set forth in order to provide a thorough understanding of one or more aspects. It may be evident, however, that such aspects may be practiced without these specific details.

Various aspects are described herein in connection with a user equipment (UE), which can be a wireless terminal. The UE can also be called a system, device, subscriber unit, subscriber station, mobile station, mobile, mobile device, remote station, remote terminal, access terminal, user terminal, terminal, communication device, user agent, or user device. The UE may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), H(e)NB, or some other terminology.

Figure 2:
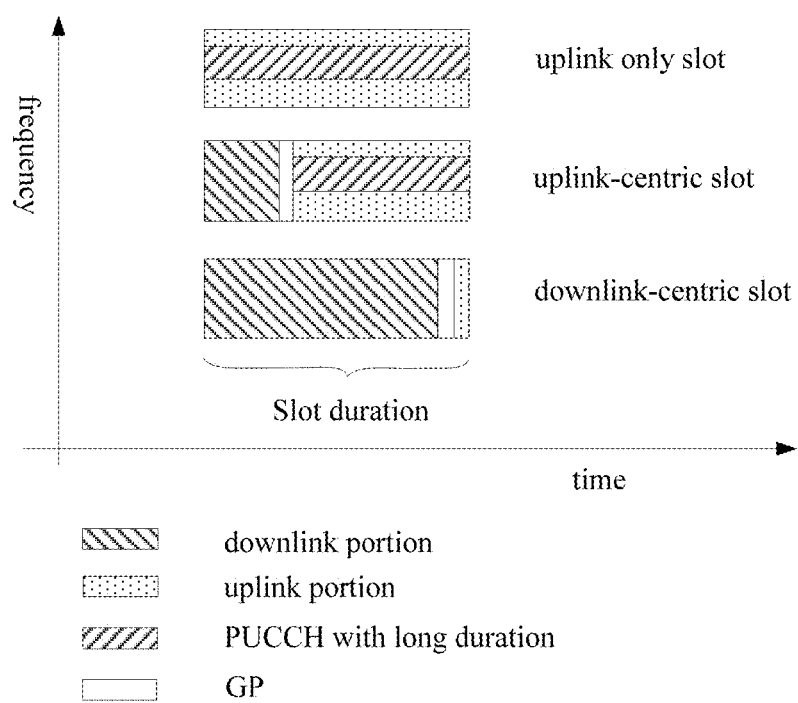
FIG. 2 illustrates several slot structure examples in the 5G NR system.

In order to provide a thorough understanding of the information transmission method and apparatus according to the embodiments of the disclosure, first of all, the slot structures used in the 5G NR system will be introduced hereinafter. FIG. 2 illustrates several slot structure examples in the 5G NR system. As an example, the slot may be classified into uplink only slot, uplink-centric slot and downlink-centric slot.

For an uplink only slot, all of the symbols in the uplink only slot are used for uplink (UL) transmission, and the PUCCH with long duration may be transmitted in the middle part of the system bandwidth (shown in FIG. 2) or the edges of the system bandwidth (not shown), or the like.

For an uplink-centric slot, symbols for both UL transmission and downlink (DL) transmission are included in the uplink centric slot, where there are more uplink symbols, there is a guard period (GP) between DL/UL transmission to allow UE to switch from DL reception to UL transmission, and the PUCCH with long duration may be transmitted the middle part of the system bandwidth (shown in FIG. 2) or the edges of the system bandwidth (not shown), or the like.

For a downlink-centric slot, symbols for both UL transmission and downlink (DL) transmission are included in the downlink-centric slot, where there are more downlink symbols, there is a guard period (GP) between DL/UL transmission to allow UE to switch from DL reception to UL transmission. As the number of uplink symbols in the downlink-centric slot relatively small, the downlink-centric slot may not be suitable for transmitting the PUCCH with long duration.

As DFT-S-OFDM will be used for PUCCH with long duration, and reference signal (RS) and uplink control information (UCI) would be multiplexed in the time division multiplex (TDM) manner, the demodulation reference signal (DMRS, the same meaning as RS here, and may also be referred to as pilot signal) for PUCCH could occupy their own symbols. In order to achieve low latency, which is a key requirement for some services in the 5G TR system, the inventor has found that RS design is an important design aspect for PUCCH with long duration. In other words, locations of DMRS needs to be re-designed from that in the LTE system.

To cope with this, the front-loaded DMRS principle is used for PUCCH with long duration in the present invention.

Figure 3:
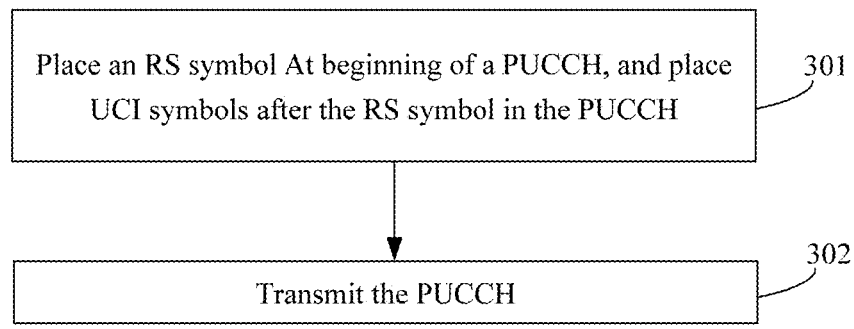
FIG. 3 illustrates a flowchart of an information transmission method according to an embodiment of the disclosure.

According to some embodiments of the disclosure, an information transmission method is provided. The method may be applied in a UE. As shown in FIG. 3, the method may include the following steps.

In step 301, an RS symbol is placed at beginning of a PUCCH, UCI symbols are placed after the RS symbol in the PUCCH.

In step 302, the PUCCH is transmitted. Specifically, the PUCCH is transmitted to a base station which in communication with the UE.

In one or more embodiments, step 301 may further include placement/locations of the rest RS symbols. In an embodiment, an RS symbol is placed at the end of the PUCCH, which improves the accuracy of demodulation of the UCI at the network side. In an embodiment, one or more RS symbols may be placed evenly in between the UCI symbols. Specifically, rest DMRS symbols are placed with one DMRS symbol for every n UCI symbols (where n is an integer greater than or equal to 1), which will be later described in detail.

In practice, the locations for the RS symbols and for the DCI symbols in the PUCCH may be pre-determined. That is, the actions for placement of RS symbols and DCI symbols in step 301 described above in the various embodiments may be combined as desired, and executed in any order or concurrently.

Figure 4A:
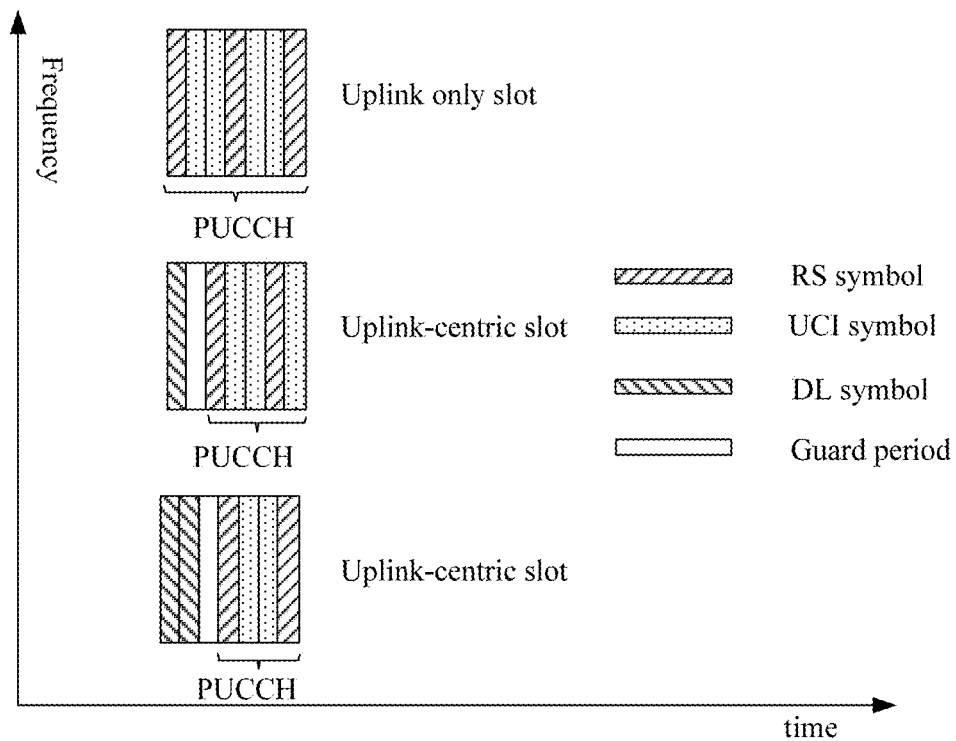
FIG. 4A illustrates some examples of RS locations for PUCCH with long duration in one slot according to the disclosure.

FIG. 4A illustrates some examples of RS locations for PUCCH with long duration in one slot according to the disclosure. A couple of slot structures are shown in the figure, which ranges from uplink-only slot to two uplink-centric slots with both DL/UL transmissions. The principles of RS placement used in these examples include: 1) front loaded DMRS at the beginning of the PUCCH; and 2) the rest DMRS symbols are placed with one DMRS symbol for every n UCI symbols, where n is an integer greater than or equal to 1.

Specifically, as shown in FIG. 4A, uplink only slots and uplink-centric slots are used for transmitting PUCCH with long duration. Here, each of the slots includes, seven symbols. However, it is to be noted that this is just an example, and a slot may, of course, includes more or less than seven symbols.

For the uplink only slot shown in the top of FIG. 4, all the symbols in the uplink only slot are uplink symbols and are dedicated for transmitting the PUCCH; the RS symbols are placed in the first symbol, the fourth symbol (which is in the middle of the slot) and the last symbol of the slot. It can be noticed that such a RS placement allow two contiguous UCI symbols in between two RS symbols, which facilitates the implementation of STBC transmit diversity scheme which will be later described in detail.

Of course, when another diversity scheme different from the STBC is employed, there is no need to keep two contiguous UCI symbols in between two RS symbols. For example, there may be just one UCI symbol in between two RS symbols.

For the uplink-centric slot shown in the middle of FIG. 4, there is one symbol (the first symbol) for DL transmission, five symbols for UL transmission, a guard period for switching from the DL transmission to UL transmission. The five symbols are dedicated for transmitting the PUCCH, where RS symbols are placed in the first and fourth symbols. It can be noticed that such a RS placement also allow two contiguous UCI symbols in between two RS symbols; and meanwhile, there is an orphan DCI symbol left (i.e., the last DCI symbol) in the PUCCH.

For the uplink-centric slot shown in the bottom of FIG. 4, there are two symbols (the first and second symbols) for DL transmission, four symbols for UL transmission, a guard period for switching from the DL transmission to UL transmission. The four symbols are dedicated for transmitting the PUCCH, where RS symbols are placed in the first and fourth symbols, i.e., at the beginning and end of the PUCCH respectively. It can be noticed that such a RS placement also allows two contiguous UCI symbols in between two RS symbols.

Figure 4B:
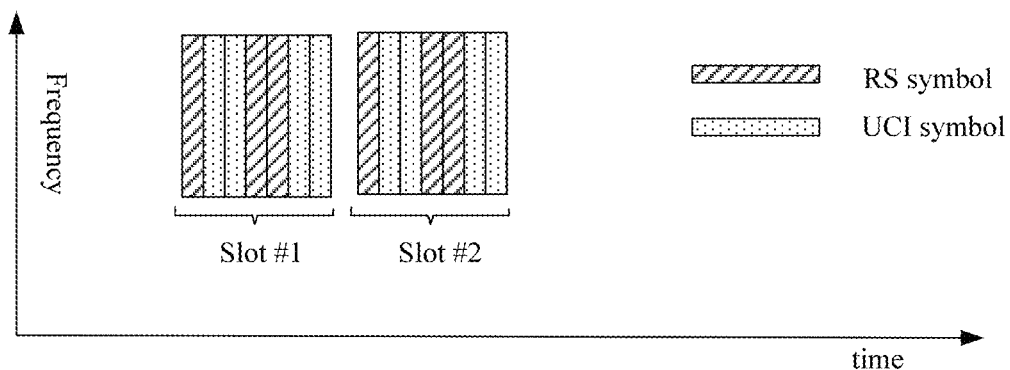
FIG. 4B illustrates an example of RS locations for PUCCH with long duration in multiple uplink only slots according to the disclosure.

FIG. 4B illustrates an example of RS locations for PUCCH with long duration in multiple uplink only slots according to the disclosure. In this example, uplink-only slots are aggregated and assigned for PUCCH. It can be noticed that placement of DMRS provides quite even distribution of RS within the aggregated slots for PUCCH and allow two contiguous UCI symbols in between two DMRS symbols to facilitate the implementation of STBC transmit diversity scheme. Another difference from the examples in FIG. 4A lies in that, two contiguous RS symbols (located in the fourth and fifth symbols) are placed immediately after every two contiguous UCI symbols, in each of the slots of the first or second type, until a last symbol in the slot is filled by an RS or UCI symbol.

It is to be noted that the placement of two contiguous RS symbols as shown in FIG. 4B can be applied in the scenario of FIG. 4A, in which no slot aggregation is used.

Another design aspect for the PUCCH with long duration accounts for improved coverage and robustness performance for the PUCCH. Unlike data channel, control channel does not have re-transmission mechanism to correct/improve its first transmission. For the 5G NR system, due to the introduction of higher frequency, the larger path loss could deteriorate the cell coverage. For downlink, the use of beamforming (BF) could compensate some of such path losses and improve the cell coverage. However, BF in uplink may not be as effective as in downlink, therefore, cell coverage could be an issue. To solve this, Discrete Fourier Transform-Spread OFDM (DFT-S-OFDM) waveform is adopted in uplink for PUCCH with long duration which leads to lower PAPR and thus smaller power back-off and larger coverage. To further improve that, transmit diversity is considered in the present invention.

For transmit diversity, a couple of schemes could be considered, which include Alamouti based transmit diversity, cyclic delay diversity (CDD), Space orthogonal-resource transmit diversity (SORTD). There are pros and cons for each of the schemes, as shown in Table 1.

TABLE 1

Comparing among different transmit diversity schemes for PUCCH

| Transmit diversity schemes | Pros | Cons |
| --- | --- | --- |
| STBC | Good diversity performance as the STBC code is orthogonal, does not need more sequence resource | Need pair of symbols in time |
| CDD | easy to implement, no requirement on pair of symbols | Relative weaker diversity as compared with other schemes |
| SORTD | Good diversity performance as orthogonal sequences are used. No requirement on pair of symbols | Double the sequence resources. |

As DFT-S-OFDM is adopted as PUCCH with long duration, orthogonal sequences like Zadoff-Chu set of sequences could be used as the modulation sequences for UCI and RS. Such sequences are mapped along frequency and multiple sequences could be used to modulated UCIs from the same/different UEs before being multiplexed on the same symbol. As each sequence is formed by a set of complex values which cannot be re-arranged, SFBC could not be used as the transmit diversity here.

In view of this, STBC is proposed in the present invention to be used as transmit diversity for PUCCH with long duration.

Figure 5:
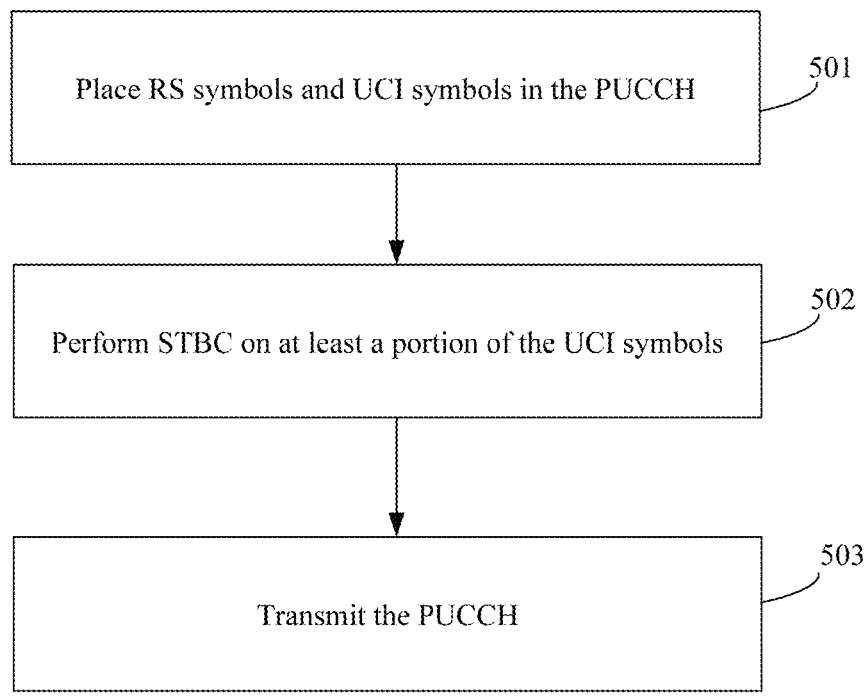
FIG. 5 illustrates a flowchart of an information transmission method according to an embodiment of the disclosure.

According to some embodiments of the disclosure, an information transmission method is provided. The method may be applied in a UE. As shown in FIG. 5, the method may include the following steps.

In step 501, RS symbols and UCI symbols are placed in the PUCCH.

In step 502, Space-Time Block Coding (STBC) is performed on at least a portion of the UCI symbols in the PUCCH to build STBC codes.

In step 503, the PUCCH is transmitted. Specifically, the PUCCH is transmitted to a base station which in communication with the UE.

For step 501, the specific placement of RS symbols and UCI symbols may refer to the embodiments described in connection with FIG. 3 and the examples described in connection with FIGS. 4A and 4B, and thus will be not elaborated here.

Regarding the STBC, specifically, in an example, the UCI may be modulated using a modulation scheme such as Binary Phase Shift Keying (BPSK) or Quadrature Phase Shift Keying (QPSK), and then an orthogonal sequence is generated for each of modulated symbols carrying UCI in the PUCCH, where the UCI symbols comprise m UCI symbols in time, where m is an integer, and greater than or equal to 2. After the orthogonal sequences are generated, STBC is performed, as described in the following.

Figure 6:
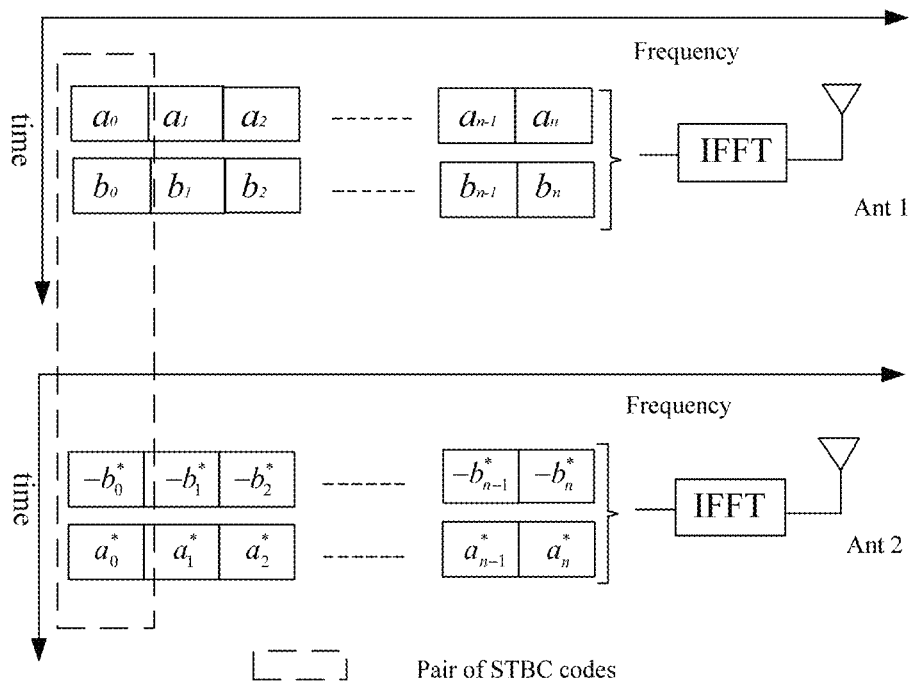
FIG. 6 illustrates a schematic view of building STBC codes as transmit diversity for PUCCH with long duration according to the disclosure.

FIG. 6 illustrates a schematic view of building STBC codes as transmit diversity for PUCCH with long duration according to the disclosure. Taking the $(2k-1)^{th}$ and $(2k)^{th}$ UCI symbols a and b for example, where k is a positive integer and smaller than or equal to m/2, the generated orthogonal sequences are $a_i$ and $b_i$ respectively, where i=0, 1, . . . , n, the elements of the orthogonal sequences $a_i$ and $b_i$ are directly used to build a first set of pairs of STBC codes, for example, the first pair is $(a_0, b_0)$, the second pair is $(a_1, b_1)$, . . . and the $n^{th}$ pair is $(a_n, b_n)$. Additionally, conjugation transformation is performed on the elements of the generated orthogonal sequences $a_i$ and $b_i$ to build a second set of pairs of STBC codes, for example, the first pair is $(-b_0^*, a_0^*)$, the second pair is $(-b_1^*, a_1^*)$, . . . and the $n^{th}$ pair is $(-b_n^*, a_n^*)$.

As shown in FIG. 6, before transmitting the PUCCH, inverse Fast Fourier Transform (IFFT) is performed on the first and second set of pairs of STBC codes, together with the orthogonal sequences corresponding to the RS symbols, to transform them into the time domain. The IFFT is known to one of ordinary skill in the art, and will not be elaborated here. Then, the PUCCH with the first set of pairs of STBC codes is transmitted via a first antenna Ant 1 and the PUCCH with the second set of pairs of STBC codes is transmitted via a second antenna Ant 2.

In the case that STBC is used as transmit diversity for PUCCH with long duration, the UCI transmitted on PUCCH could be spread/repeated and transmitted on same/different symbols within the time-frequency resources assigned for PUCCH. As the STBC codes are orthogonal, good diversity performance can be implemented and thus the coverage and robustness performance of PUCCH with long duration is improved; and additionally, no more sequence resources are needed.

As pair of symbols in time are needed to build STBC codes, in some embodiments, orphan symbol (for example, when m is an odd number) may be left in the time domain. In this case, other transmit diversity schemes such as CDD or SORTD could be used for the orphan symbol.

In order to increase frequency diversity gain, the present invention further proposes frequency hopping as a yet another design aspect of PUCCH with long duration.

Figure 7:
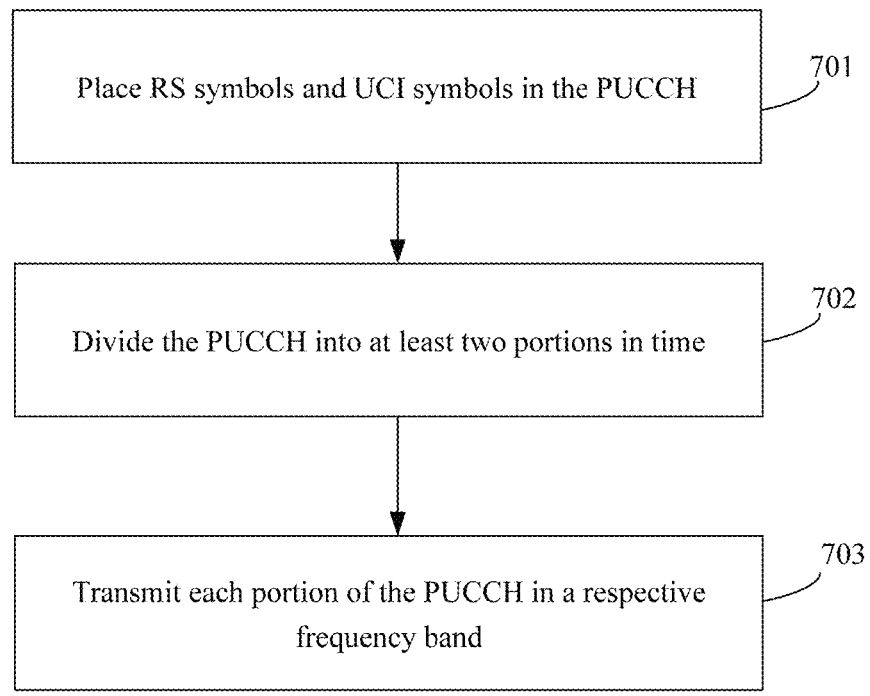
FIG. 7 illustrates a flowchart of an information transmission method according to an embodiment of the disclosure.

According to some embodiments of the disclosure, an information transmission method is provided. The method may be applied in a UE. As shown in FIG. 7, the method may include the following steps.

In step 701, RS symbols and UCI symbols are placed in the PUCCH.

In step 702, the PUCCH is divided into at least two portions in time.

In step 703, the PUCCH is transmitted in such a way that each portion is transmitted in a respective frequency band.

In an embodiment, for step 701, the specific placement of RS symbols and UCI symbols may refer to the embodiments described in connection with FIG. 3 and the examples described in connection with FIG. 4A and FIG. 4B, and thus will be not elaborated here.

Of course, transmit diversity may be combined with frequency hopping to achieve optimum performance. For example, step 502 may be executed before step 702. Such a combination can be understood by one of ordinary skill in the art, and will not be elaborated here.

Figure 8A:
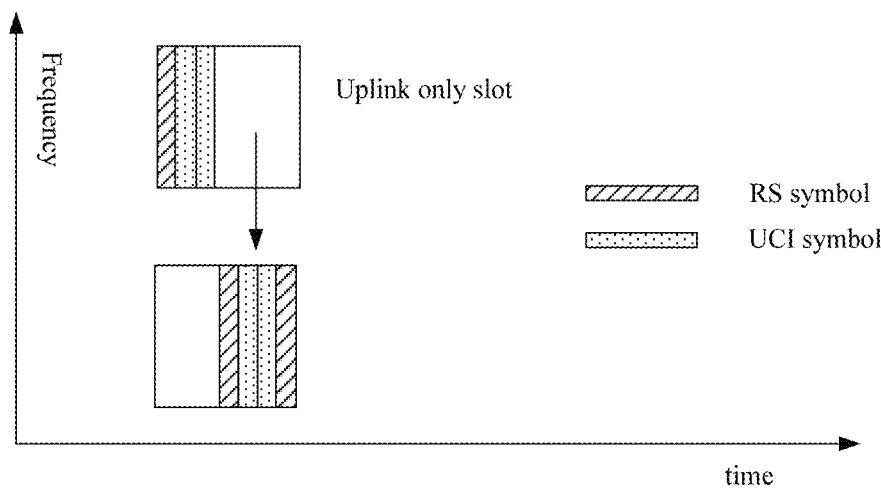
FIG. 8A illustrates an example of intra-slot hopping for PUCCH with long duration in an uplink-only slot according to the disclosure.
Figure 8B:
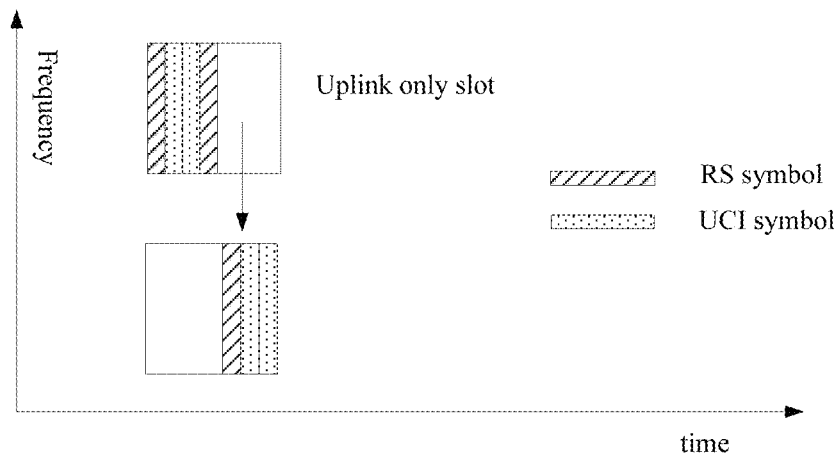
FIG. 8B illustrates another example of intra-slot hopping for PUCCH with long duration in an uplink-only slot according to the disclosure.
Figure 8C:
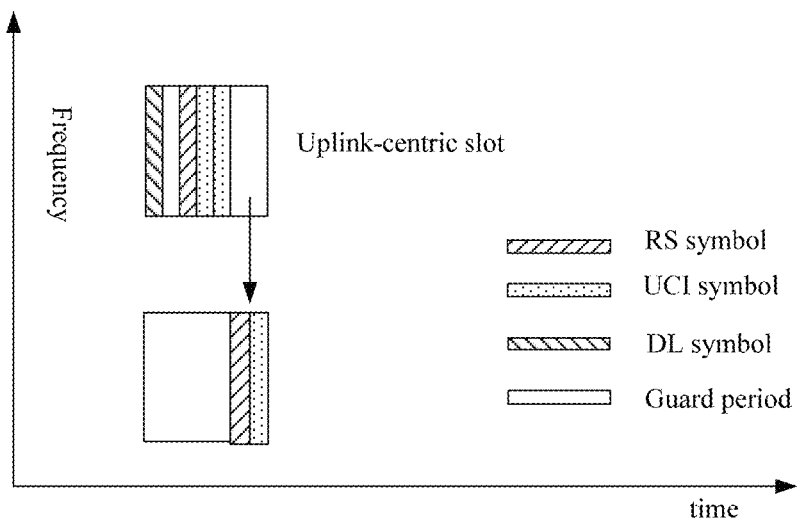
FIG. 8C illustrates an example of intra-slot hopping for PUCCH with long duration in an uplink-centric slot according to the disclosure.

For frequency hopping, intra-slot and inter-slot hopping of PUCCH with long duration could be used. In terms of intra-slot hopping, the portion (symbols) that hops to another part of frequency may need to have RS symbol to start with. FIG. 8A and FIG. 8B illustrate two examples of intra-slot hopping for PUCCH with long duration in an uplink-only slot according to the disclosure, which use the same RS designs as shown in FIG. 4A and FIG. 4B in the above. In general, it would be good to consider such operations when designing DMRS symbols and avoid to have two sets of DMRS design, one for non-hopping and one for hopping. FIG. 8C illustrates an intra-slot hopping for PUCCH with long duration in an uplink-centric slot according to the disclosure. Since the uplink-centric slot have more uplink symbols available for PUCCH relative to the uplink-centric slots, it may be more worth applying intra-slot frequency hopping for the uplink-centric slot.

In this embodiment, frequency hopping, particularly the intra-slot hopping, is used for PUCCH with long duration, the UCI in the PUCCH could be transmitted in different frequency bands, and thus the frequency diversity gain is improved.

Based on the several information transmission method embodiments described above, an information transmission apparatus is provided according to some embodiments of the disclosure.

Figure 9:
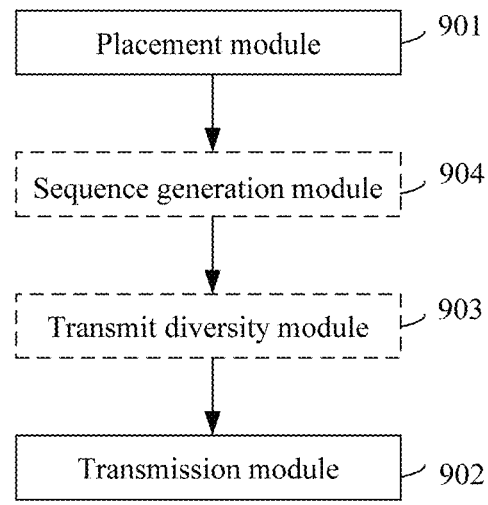
FIG. 9 illustrates a block diagram of an information transmission apparatus according to an embodiment of the disclosure.

As shown in FIG. 9, the information transmission apparatus 900 includes a placement module 901, and a transmission module 902. In practice, the placement module 901 may be realized by a software module stored in a memory and executable by a processor, or may be hardware circuits, or may be a combination thereof. Therefore, the placement module 901 may be referred to as a placement circuit in some cases. The transmission module 902 may be realized by a transmitter circuit including multiple antennas.

The placement module 901 may be configured to place a first RS symbol at beginning of a PUCCH, and place UCI symbols after the first RS symbol in the PUCCH.

The transmission module 902 may be configured to transmit the PUCCH.

In an embodiment, the transmitter may be configured to perform one of the following: transmit the PUCCH in one or more slots of a first type, wherein all symbols in each of the slots of the first type are uplink, which are dedicated for transmitting the PUCCH; transmit the PUCCH in one or more slots of a second type, wherein more than one half of symbols in each of the slots of the second type are uplink, which are dedicated for transmitting the PUCCH; and transmit the PUCCH in multiple slots comprising one or more slots of the first type and one or more slots of the second type, and the placement module may be configured to place the first RS symbol at the beginning of the PUCCH, in each of the slots of the first or second type.

In an embodiment, the placement module 901 may further be configured to perform at least one of the following: place a second RS symbol at end of the PUCCH, in each of the slots of the first or second type; and place one or more third RS symbols evenly in between the UCI symbols, in the PUCCH in each of the slots of the first or second type.

In an embodiment, the placement module 901 may further be configured to place one or two RS symbols immediately after every n contiguous UCI symbols, in each of the slots of the first or second type, until a last symbol in the slot is filled by an RS or UCI symbol, where n is an integer greater than or equal to 1.

In an embodiment, the apparatus 900 may further include a transmit diversity module 903, configured to perform Space-Time Block Coding (STBC) on at least a portion of the UCI symbols in the PUCCH to build STBC codes. In practice, transmit diversity module 903 may be realized by a software module stored in a memory and executable by a processor, or may be hardware circuits, or may be a combination thereof. Therefore, the transmit diversity module 903 may be referred to as a transmit diversity circuit or a transmit diversity coder in some cases.

In an embodiment, the apparatus 900 may further include a sequence generation module 904. In practice, the sequence generation module 904 may be realized by a software module stored in a memory and executable by a processor, or may be hardware circuits, or may be a combination thereof. Therefore, the sequence generation module 904 may be referred to as a sequence generation circuit or a sequence generator in some cases. The sequence generation module 904 may be configured to for each of modulated symbols carrying UCI in the PUCCH, where the UCI symbols comprise m UCI symbols in time, where m is an integer, and greater than or equal to 2. In this embodiment, the transmit diversity module 903 is configured to: for $(2k-1)^{th}$ and $(2k)^{th}$ UCI symbols in time, where k is a positive integer and smaller than or equal to m/2, directly use elements of the orthogonal sequences corresponding to the $(2k-1)^{th}$ and $(2k)^{th}$ UCI symbols to build a first set of pairs of STBC codes, and perform conjugation transformation on the elements of the generated orthogonal sequences corresponding to the $(2k-1)^{th}$ and $(2k)^{th}$ UCI symbols to build a second set of pairs of STBC codes. in the transmission module 902 may be configured to: transmit the PUCCH with the first set of pairs of STBC codes via a first antenna; and transmit the PUCCH with the second set of pairs of STBC codes via a second antenna.

In an embodiment, when m is an odd number, before the PUCCH is transmitted, the transmit diversity module 903 may further configured to perform Cyclic Delay Diversity (CDD) or Space Orthogonal-Resource Transmit Diversity (SORTD) on a last DCI symbol in time among the m DCI symbols to build CDD or SORTD codes for the last DCI symbol.

In an embodiment, the transmission module 902 may further be configured to divide the PUCCH transmitted in a single one of the first or second slots into a first portion and a second portion; transmit the first portion of the PUCCH in a first frequency band; and transmit the second portion of the PUCCH in a second frequency band. The PUCCH may be divided such that the second portion of the PUCCH begins with an RS symbol.

Figure 1:
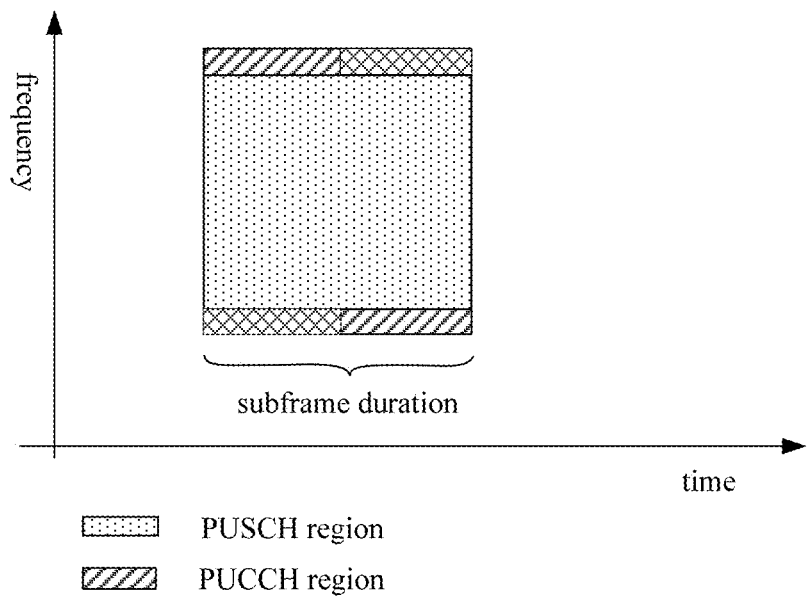
FIG. 1 illustrates a typical PUCCH transmission scheme in the 4G LTE system.
Figure 10:
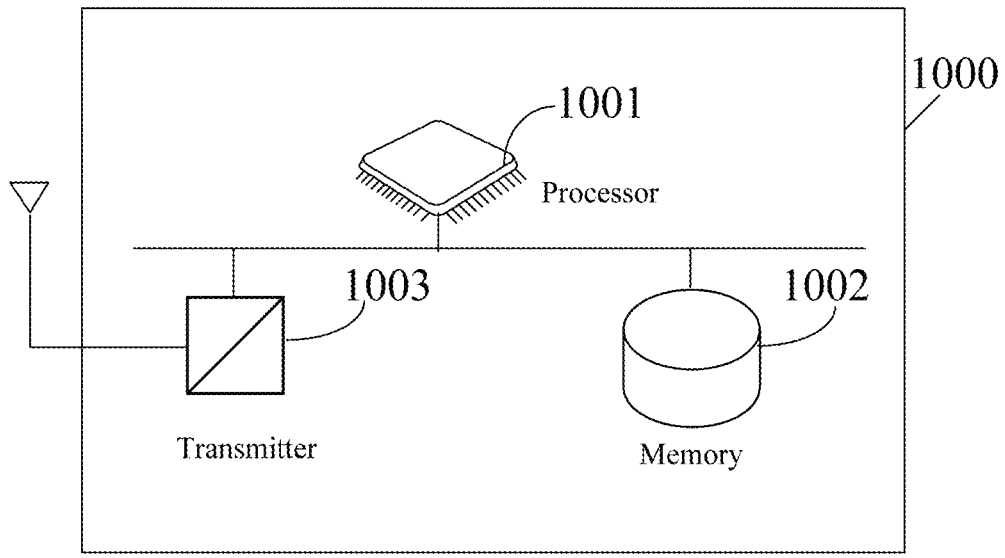
FIG. 10 illustrates a simplified structure diagram of a UE according to an embodiment of the disclosure.

FIG. 10 is a simplified structural diagram of a UE according to an embodiment of the disclosure. The UE 1000 may include a processor 1001, a memory 1002, a transmitter 1003 having multiple antennas and other parts (e.g., a touch screen, not shown). The memory 1002 stores program instructions, which when executed by the processor 1001, cause the processor 1001 to perform at least one of the method described in connection with FIGS. 1, 5 and 7. The apparatus as shown in FIG. 9 may be implemented in the UE 1000.

The benefits of the apparatus described here correspond to those described for the information transmission methods, and thus are omitted here.

Those skilled in the art will appreciate that all or a part of the steps in the above embodiments can be implemented by computer programs. The computer programs can be stored in a computer readable storage medium and executed on a corresponding hardware platform (e.g., system, equipment, apparatus, device and the like) to perform one or a combination of the steps in the method embodiments.

Optionally, all or a part of the steps in the above embodiments can be implemented using Integrated Circuits (ICs). These steps can be implemented by one or more IC modules. As such, the present invention is not limited to any specific combination of hardware circuitry and software.

Respective devices or functional modules or functional units in the above embodiments can be implemented using general computing devices, which can be located in a single computing apparatus or distributed on a network including multiple computing devices.

When respective devices or functional modules or functional units in the above embodiments are implemented in the form of software functional modules and then sold or used as an independent product, they can be stored in a computer readable storage medium. The aforementioned computer readable storage medium can be magnetic disks and/or optical disks, such as Read Only Memories (ROMs), and the like.

According to the disclosure, front-loaded RS is used in RS design for PUCCH with long duration, which achieves low latency of services in the 5G TR system. Rest RS symbols may be placed with one DMRS symbol for every n UCI symbols, where n is an integer greater than or equal to 1. Frequency hopping may also be used for PUCCH with long duration, thus obtaining more frequency diversity gain. When STBC is used as transmit diversity of PUCCH with long duration, it would bring superior transmit diversity gain, does not require additional sequence resources, and improve coverage and robustness performances.

The above description are merely preferable embodiments of the disclosure and are not intended to limit the scope of protection of the disclosure, and it will be apparent to those skilled in the art that various substitutions, modifications and changes may be made without departing from the scope and spirit of the invention. Therefore, the scope of protection of the disclosure should be interpreted solely in light of the claims.

INDUSTRIAL APPLICABILITY

According to the disclosure, front-loaded RS is used in RS design for PUCCH with long duration, which achieves low latency of services in the 5G TR system. When STBC is used as transmit diversity of PUCCH with long duration, it would bring superior transmit diversity gain, does not require additional sequence resources, and improve coverage and robustness performances. Rest RS symbols may be placed with one DMRS symbol for every n UCI symbols. Frequency hopping may also be used for PUCCH with long duration, thus obtaining more frequency diversity gain.

The invention claimed is:

1. An information transmission method, comprising:
   transmitting a Physical Uplink Control Channel (PUCCH) having at least three Reference Signal (RS) symbols,
   wherein only Uplink Control Information (UCI) symbols are located between a first RS symbol and a second RS symbol of the at least three RS symbols, and a number of the UCI symbols between the first RS symbol and the second RS symbol is 2, and
   wherein all symbols in the PUCCH are allocated in a same frequency resource.

2. The method according to claim 1, further comprising:
   generating an orthogonal sequence for each UCI symbol among m UCI symbols in the PUCCH, wherein m is an integer, and greater than or equal to 2,
   wherein for $(2k-1)^{th}$ and $(2k)^{th}$ UCI symbols in time,
   directly using elements of the orthogonal sequences corresponding to the $(2k-1)^{th}$ and $(2k)^{th}$ UCI symbols to build a first set of pairs of Space-Time Block Coding (STBC) codes, and
   performing conjugation transformation on elements of the generated orthogonal sequences corresponding to the $(2k-1)^{th}$ and $(2k)^{th}$ UCI symbols to build a second set of pairs of STBC codes;
   wherein the transmitting the PUCCH comprises:
   transmitting the PUCCH with the first set of pairs of STBC codes via a first antenna; and
   transmitting the PUCCH with the second set of pairs of STBC codes via a second antenna,
   where k is a positive integer and smaller than or equal to m/2.

3. The method according to claim 2, wherein when m is an odd number, the method further comprising:
   performing Cyclic Delay Diversity (CDD) or Space Orthogonal-Resource Transmit Diversity (SORTD) on a last UCI symbol in time among the m UCI symbols to build CDD or SORTD codes for the last UCI symbol.

4. The method according to claim 1, wherein the PUCCH has at least one first UCI symbol each of which is not allocated between two of the at least three RS symbols.

5. The method according to claim 1, wherein a number of the UCI symbols between a third RS symbol and the second RS symbol of the at least three RS symbols is not equal to 2.

6. The method according to claim 5, wherein the number of the UCI symbols between the third RS symbol and the second RS symbol is smaller than 2.

7. An information transmission apparatus, comprising a processor, a memory, and a transmitter, the memory having instructions stored therein, which when executed by the processor, causes the processor to:
   control the transmitter to transmit a PUCCH having at least three Reference Signal (RS) symbols;
   wherein only Uplink Control Information (UCI) symbols are located between a first RS symbol and a second RS symbol of the at least three RS symbols, and a number of the UCI symbols between the first RS symbol and the second RS symbol is 2, and
   wherein all symbols in the PUCCH are allocated in a same frequency resource.

8. The apparatus according to claim 7, wherein the processor is further configured to:
   generate an orthogonal sequence for each UCI symbol among m UCI symbols in the PUCCH, wherein m is an integer, and greater than or equal to 2; and
   for $(2k-1)^{th}$ and $(2k)^{th}$ UCI symbols in time,
   directly use elements of the orthogonal sequences corresponding to the $(2k-1)^{th}$ and $(2k)^{th}$ UCI symbols to build a first set of pairs of Space-Time Block Coding (STBC) codes, and
   perform conjugation transformation on elements of the generated orthogonal sequences corresponding to the $(2k-1)^{th}$ and $(2k)^{th}$ UCI symbols to build a second set of pairs of STBC codes;
   wherein the transmitter is configured to:
   transmit the PUCCH with the first set of pairs of STBC codes via a first antenna; and
   transmit the PUCCH with the second set of pairs of STBC codes via a second antenna,
   where k is a positive integer and smaller than or equal to m/2.

9. The apparatus according to claim 8, wherein when m is an odd number, before the PUCCH is transmitted, the processor is further configured to:
   perform Cyclic Delay Diversity (CDD) or Space Orthogonal-Resource Transmit Diversity (SORTD) on a last UCI symbol in time among the m UCI symbols to build CDD or SORTD codes for the last UCI symbol.

10. The apparatus according to claim 7, wherein the PUCCH has at least one first UCI symbol each of which is not allocated between two of the at least three RS symbols.

11. The apparatus according to claim 7, wherein a number of the UCI symbols between a third RS symbol and the second RS symbol of the at least three RS symbols is not equal to 2.

12. The apparatus according to claim 11, wherein the number of the UCI symbols between the third RS symbol and the second RS symbol is smaller than 2.

13. A non-transitory computer readable storage medium, having instructions stored therein, which when executed by a processor, causes the processor to:
- control a transmitter to transmit a PUCCH having at least three Reference Signal (RS) symbols,
- wherein only Uplink Control Information (UCI) symbols are located between a first RS symbol and a second RS symbol of the at least three RS symbols, and a number of the UCI symbols between the first RS symbol and the second RS symbol is 2, and
- wherein all symbols in the PUCCH are allocated in a same frequency resource.

14. The non-transitory computer readable storage medium according to claim 13, wherein the PUCCH has at least one first UCI symbol each of which is not allocated between two of the at least three RS symbols.

* * * * *